(12) United States Patent
Zen et al.

(10) Patent No.: US 11,265,465 B2
(45) Date of Patent: Mar. 1, 2022

(54) IMAGING ELEMENT, IMAGING APPARATUS, AND CONTROL METHOD FOR IMAGING ELEMENT

(71) Applicant: Sony Corporation, Tokyo (JP)

(72) Inventors: Masao Zen, Chiba (JP); Jun Hashizume, Tokyo (JP); Tsutomu Nakajima, Tokyo (JP); Norihiro Ichimaru, Kanagawa (JP)

(73) Assignee: Sony Corporation, Tokyo (JP)

( * ) Notice: Subject to any disclaimer, the term of this patent is extended or adjusted under 35 U.S.C. 154(b) by 11 days.

(21) Appl. No.: 16/860,932

(22) Filed: Apr. 28, 2020

(65) Prior Publication Data

US 2020/0260003 A1   Aug. 13, 2020

Related U.S. Application Data

(63) Continuation of application No. 16/092,366, filed as application No. PCT/JP2016/089206 on Dec. 29, 2016, now Pat. No. 10,645,279.

(30) Foreign Application Priority Data

Apr. 15, 2016 (JP) .............................. JP2016-082083

(51) Int. Cl.
*H04N 5/232* (2006.01)
*G06T 1/60* (2006.01)
(Continued)

(52) U.S. Cl.
CPC ......... *H04N 5/23232* (2013.01); *G06F 5/065* (2013.01); *G06F 5/12* (2013.01);
(Continued)

(58) Field of Classification Search
CPC .... H04N 5/23232; H04N 5/353; H04N 5/351; H04N 5/23245; H04N 5/369;
(Continued)

(56) References Cited

U.S. PATENT DOCUMENTS

| 4,510,581 A | 4/1985 | Cohen |
| 5,633,976 A * | 5/1997 | Ogino .................. H04N 1/2112 348/231.1 |

(Continued)

FOREIGN PATENT DOCUMENTS

| CN | 103491276 A | 1/2014 |
| CN | 104349168 A | 2/2015 |

(Continued)

OTHER PUBLICATIONS

Chinese Office Action dated Apr. 2, 2020 in connection with Chinese Application No. 201680084635.1, and English translation thereof.

(Continued)

*Primary Examiner* — Mekonnen D Dagnew
(74) *Attorney, Agent, or Firm* — Wolf, Greenfield & Sacks, P.C.

(57) ABSTRACT

An imaging apparatus including a frame buffer executes high-speed shooting consecutively in plural sessions.

An imaging element includes a buffer, an image producing unit, a managing unit, and an output unit. The image producing unit produces an image in the case where an empty capacity of any of plural areas in the buffer exceeds a predetermined threshold value. The managing unit causes an area whose empty capacity exceeds the predetermined threshold value, of the plural areas to retain the image as a buffering image. The output unit extracts the buffering image from the buffer and outputting the buffering image, in order of the retention of the buffering image.

8 Claims, 15 Drawing Sheets

(51) Int. Cl.
  *G06F 5/06* (2006.01)
  *G06F 5/12* (2006.01)
  *G06F 12/02* (2006.01)
  *H04N 5/351* (2011.01)
  *H04N 5/369* (2011.01)
  *H04N 5/353* (2011.01)

(52) U.S. Cl.
  CPC .............. *G06F 12/023* (2013.01); *G06T 1/60* (2013.01); *H04N 5/23245* (2013.01); *H04N 5/351* (2013.01); *H04N 5/353* (2013.01); *H04N 5/369* (2013.01)

(58) Field of Classification Search
  CPC .......... G06F 12/023; G06F 5/12; G06F 5/065; G06F 2212/1024; G06F 2212/455; G06F 12/0207; G06T 1/60
  See application file for complete search history.

(56) References Cited

U.S. PATENT DOCUMENTS

| | | | |
|---|---|---|---|
| 10,645,279 | B2 | 5/2020 | Zen et al. |
| 2002/0051643 | A1 | 5/2002 | Nakashita |
| 2010/0045812 | A1 | 2/2010 | Miyakoshi |
| 2010/0214439 | A1 | 8/2010 | Oshima et al. |
| 2011/0084197 | A1* | 4/2011 | Sugawa ................ H04N 5/335 250/208.1 |
| 2011/0093629 | A1 | 4/2011 | Badi et al. |
| 2012/0075465 | A1 | 3/2012 | Wengrovitz et al. |
| 2012/0218453 | A1* | 8/2012 | Hosokawa ......... H04N 1/00307 348/333.11 |
| 2012/0331083 | A1 | 12/2012 | Li et al. |
| 2014/0009627 | A1 | 1/2014 | Tanaka et al. |
| 2014/0232892 | A1 | 8/2014 | Campbell |
| 2019/0166306 | A1 | 5/2019 | Zen et al. |

FOREIGN PATENT DOCUMENTS

| | | |
|---|---|---|
| EP | 2 096 862 A1 | 9/2009 |
| EP | 2 173 088 A1 | 4/2010 |
| EP | 2 288 142 A1 | 2/2011 |
| EP | 3 445 031 A1 | 2/2019 |
| JP | 2002-199328 A | 7/2002 |
| WO | WO 2009/150828 A1 | 12/2009 |
| WO | WO 2012/044463 A1 | 4/2012 |
| WO | WO 2014/166248 A1 | 10/2014 |

OTHER PUBLICATIONS

International Search Report and Written Opinion and English translations dated Mar. 21, 2017 in connection with International Application No. PCT/JP2016/089206.

International Preliminary Report on Patentability and English translation dated Oct. 25, 2018 in connection with International Application No. PCT/JP2016/089206.

Extended European Search Report dated Mar. 6, 2019 with European Application No. 16898705.5.

U.S. Appl. No. 16/092,366, filed Oct. 9, 2018, Zen et al.

* cited by examiner

N ELEMENT, IMAGING
APPARATUS, AND CONTROL METHOD FOR
IMAGING ELEMENT

CROSS-REFERENCE TO RELATED APPLICATIONS

This application is a continuation of U.S. patent application Ser. No. 16/092,366, filed on Oct. 9, 2018, which claims the benefit under 35 U.S.C. § 371 as a U.S. National Stage Entry of International Application No. PCT/JP2016/089206, filed in the Japanese Patent Office as a Receiving Office on Dec. 29, 2016, which claims priority to Japanese Patent Application Number JP2016-082083, filed in the Japanese Patent Office on Apr. 15, 2016, each of which is hereby incorporated by reference in its entirety.

TECHNICAL FIELD

The present technique relates to an imaging element, an imaging apparatus, and a control method for an imaging element. The present technique relates more particularly to an imaging element that includes a frame buffer, an imaging apparatus, and a control method for the imaging element.

BACKGROUND ART

In the past, an imaging apparatus that high-speed-shoots a moving image at a frame rate higher than a frame rate for reproduction has been used when an object moving at a high speed is imaged. A smooth slow-motion video image is acquired by reproducing this moving image at a frame rate that is lower than that for recording. For example, when a moving image imaged at a high frame rate of 600 hertz (Hz) is reproduced at a low frame rate of 60 hertz (Hz), the reproduction time period is elongated to a 10-fold length of the recording time period and the speed of the action of the object in the reproduced moving image is reduced to $\frac{1}{10}$. When the image data (a frame) high-speed-shot in this manner is output to a signal processing unit at the high frame rate as it is, the frame may not be completely processed by the signal processing unit whose processing speed is low. An imaging apparatus has therefore been proposed that temporarily retains a high-speed-shot frame in a memory (that is, buffering) and that outputs the frame to the signal processing unit at a low frame rate (see, e.g., PTL 1).

CITATION LIST

Patent Literature

[PTL 1]
JP 2008-113126A

SUMMARY

Technical Problem

In the above related technique, to prevent any overflow of the memory, the high-speed shooting is executed when a sufficient empty portion is present in the memory, and the buffered frame is extracted from the memory and is output when the recording is stopped or the like. In the case where two sessions of high-speed shooting are executed, the imaging apparatus therefore cannot start the second session of the high-speed shooting until an empty portion is produced in the memory when no sufficient empty portion is present in the memory due to the first session of the high-speed shooting. As above, a problem arises that it is difficult to execute the high-speed shooting consecutively in plural sessions.

The present technique was conceived in view of the above circumstances and an object thereof is to execute high-speed shooting consecutively in plural sessions using an imaging apparatus that includes a frame buffer.

Solution to Problem

The present technique was completed to solve the above problem and a first aspect thereof is an imaging element including a buffer that has plural areas disposed therein, an image producing unit that produces an image in the case where an empty capacity of any of the plural areas exceeds a predetermined threshold value, a managing unit that causes an area whose empty capacity exceeds the predetermined threshold value, of the plural areas to retain the image as a buffering image, and an output unit that extracts the buffering image from the buffer in order of the retention of the buffering image and outputs the buffering image, and a control method for the imaging element. An action is thereby provided that an image is produced in the case where an empty capacity of any of plural areas in a buffer exceeds a predetermined threshold value.

Furthermore, in the first aspect, the image producing unit may produce the image as a preview image every time a predetermined cycle elapses in a predetermined normal shooting period and may produce the image as a high-speed shooting image every time a cycle that is shorter than the predetermined cycle elapses in the case where an empty capacity of any of the plural areas exceeds the predetermined threshold value in a high-speed shooting period that is different from the predetermined normal shooting period, and the managing unit may cause the high-speed shooting image to be retained as the buffering image. An action is thereby provided that a preview image is produced every time a predetermined cycle elapses and a buffering image is retained every time a cycle that is shorter than the predetermined cycle elapses.

Furthermore, in the first aspect, the output unit may further output the preview image together with the buffering image every time the predetermined cycle elapses. An action is thereby provided that a preview image is output together with a buffering image every time a predetermined cycle elapses.

Furthermore, in the first aspect, the managing unit may cause the buffer to retain the preview image together with the buffering image and the output unit may extract the buffering image and the preview image from the buffer in order of the retention of these images and may output these images. An action is thereby provided that a buffering image and the preview image are extracted from the buffer in order of their retention.

Furthermore, in the first aspect, the output unit may extract the buffering image from the buffer and may output the buffering image when a predetermined operation is executed. An action is thereby provided that a buffering image is extracted when a predetermined operation is executed.

Furthermore, in the first aspect, the output unit may extract the buffering image from the buffer and may output the buffering image when the high-speed shooting period comes to an end. An action is thereby provided that a buffering image is extracted when a high-speed shooting period comes to an end.

Furthermore, in the first aspect, the output unit may extract the plural buffering images and may output these buffering images every time the predetermined cycle elapses. An action is thereby provided that plural buffering images are extracted every time a predetermined cycle elapses.

Furthermore, a second aspect of the present technique is an imaging apparatus including a buffer that has plural areas disposed therein, an image producing unit that produces an image in the case where an empty capacity of any of the plural areas exceeds a predetermined threshold value, a managing unit that causes an area whose empty capacity exceeds the predetermined threshold value, of the plural areas to retain the image as a buffering image, an output unit that extracts the buffering image from the buffer in order of the retention of the buffering image and outputs the buffering image, and a recording unit that records the output image. An action is thereby provided that an image is recorded in the case where an empty capacity of any of plural areas in a buffer exceeds a predetermined threshold value.

Advantageous Effect of Invention

According to the present technique, an excellent effect can be achieved that an imaging apparatus retaining an image can execute high-speed shooting consecutively in plural sessions. In addition, the effect described in this paragraph is not necessarily limited and may be any effect described in the disclosure.

DESCRIPTION OF EMBODIMENTS

Modes for carrying out the present technique (hereinafter, referred to as "embodiments") will be described below. The description will be made in the following order.

1. First Embodiment (An example where buffering into any of plural areas is executed)

2. Second Embodiment (An example where a recording frame is buffered in any of plural areas and is output in order of shooting)

1. First Embodiment

[Example of Configuration of Imaging Apparatus]

Figure 1:
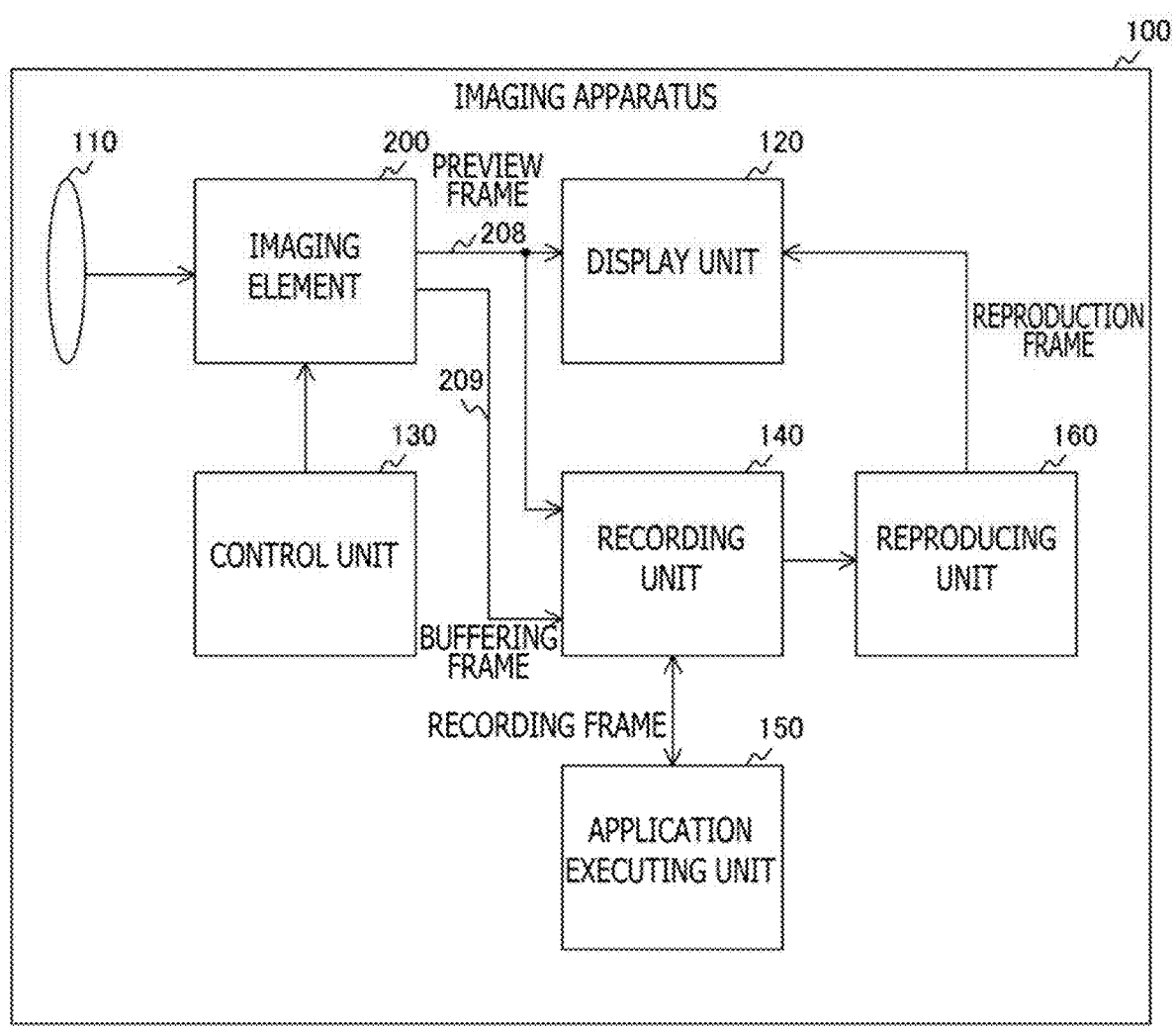
FIG. 1 is a block diagram depicting an example of the configuration of an imaging apparatus in a first embodiment of the present technique.

FIG. 1 is a block diagram depicting an example of the configuration of an imaging apparatus 100 in a first embodiment. The imaging apparatus 100 is an apparatus that images image data (a frame), and includes an imaging lens 110, a displaying unit 120, a control unit 130, a recording unit 140, an application executing unit 150, and a reproducing unit 160. In addition to digital cameras such as a digital still camera and a digital video camera, a smartphone, a personal computer, and the like each having an imaging function are each assumed as the imaging apparatus 100.

The imaging lens 110 is a component that condenses a light beam and leads the light beam to an imaging element 200. The imaging element 200 is a component that images a frame by photoelectric-converting the light beam from the imaging lens 110. The imaging element 200 images a frame at a specific frame rate and outputs the frame to at least one of the displaying unit 120 or the recording unit 140 as a preview frame.

Furthermore, the imaging element 200 produces a frame at a frame rate that is higher than a frame rate for a preview frame and retains the produced frame as a buffering frame. The imaging element 200 outputs the buffering frame to the recording unit 140 when a predetermined operation (such as pressing down an imaging stop button) is executed. In this regard, the output of the preview frame is continued even during the output of the buffering frame.

The displaying unit 120 is a component that displays the preview frame. The control unit 130 is a component that controls the overall imaging apparatus 100. The recording unit 140 is a component that records the frame. The application executing unit 150 is a component that executes a predetermined application. The application executing unit 150 edits the frame in the recording unit 140 and produces a moving image that includes a recording frame. The reproducing unit 160 is a component that reproduces the moving image. The reproducing unit 160 supplies the recording frame at a frame rate that is lower than that employed when the buffering frame is imaged, as a reproduction frame to the displaying unit 120.

Concerning the above, the states of the imaging apparatus 100 include a shooting mode and a preview mode. This shooting mode is classified into a normal shooting mode and a high-speed shooting mode. The normal shooting mode is a mode in which a frame is produced at a frame rate that is lower than that of the high-speed shooting mode and executes the recording and the displaying for the frame. The high-speed shooting mode is a mode in which a frame is produced at a frame rate that is higher than that of the normal shooting mode. The preview mode is a mode in which a frame is produced at a frame rate that is lower than that of the high-speed shooting mode and only the displaying is executed for the frame without executing any recording.

When the power source of the imaging apparatus 100 is turned on, the imaging apparatus 100 transitions into the preview mode. In this preview mode, the control unit 130 causes the imaging element 200 to produce the preview frame at the frame rate that is lower than that of the high-speed shooting mode and to output the preview frame to the displaying unit 120. Furthermore, in the preview mode, when the imaging element 200 retains any buffering frame, the control unit 130 causes the imaging element 200 to output the frame to the recording unit 140.

When an operation of starting recording (such as pressing down a recording start button) is thereafter executed, the imaging apparatus 100 transitions into the normal shooting mode from the preview mode. In this normal shooting mode, the control unit 130 causes the imaging element 200 to produce a preview frame at the frame rate that is lower than that of the high-speed shooting mode and to output the preview frame to the displaying unit 120 and the recording unit 140.

Furthermore, in the normal shooting mode, when a predetermined condition (such as the case where a scene is changed, or the like) is satisfied, the imaging apparatus 100 furthermore transitions into the high-speed shooting mode. Furthermore, in this high-speed shooting mode, the imaging element 200 produces a frame at the frame rate that is higher than that of the normal shooting mode, and buffers the frame. In the high-speed shooting mode, the control unit 130 causes the imaging element 200 to output the preview frame at the equal frame rate to that of the normal shooting mode to the displaying unit 120.

The frame rate in the normal shooting mode is, for example, 30 fps (frames per second) and the frame rate in the normal shooting mode is, for example, 960 fps. It is noted that the frame rates of these modes are not limited to 30 fps and 960 fps only when the frame rate of the high-speed shooting mode is higher than that of the normal shooting mode.

In addition, though all the imaging lens 110, the displaying unit 120, the control unit 130, the recording unit 140, the application executing unit 150, and the reproducing unit 160 are arranged in the imaging apparatus 100, these components may be arranged being distributed to plural apparatuses. For example, the imaging lens 110, the control unit 130, the recording unit 140, and the application executing unit 150 may be arranged in a camera module, and the displaying unit 120 and the reproducing unit 160 may be arranged in a reproducing apparatus.

[Example of Configuration of Imaging Element]

Figure 2:
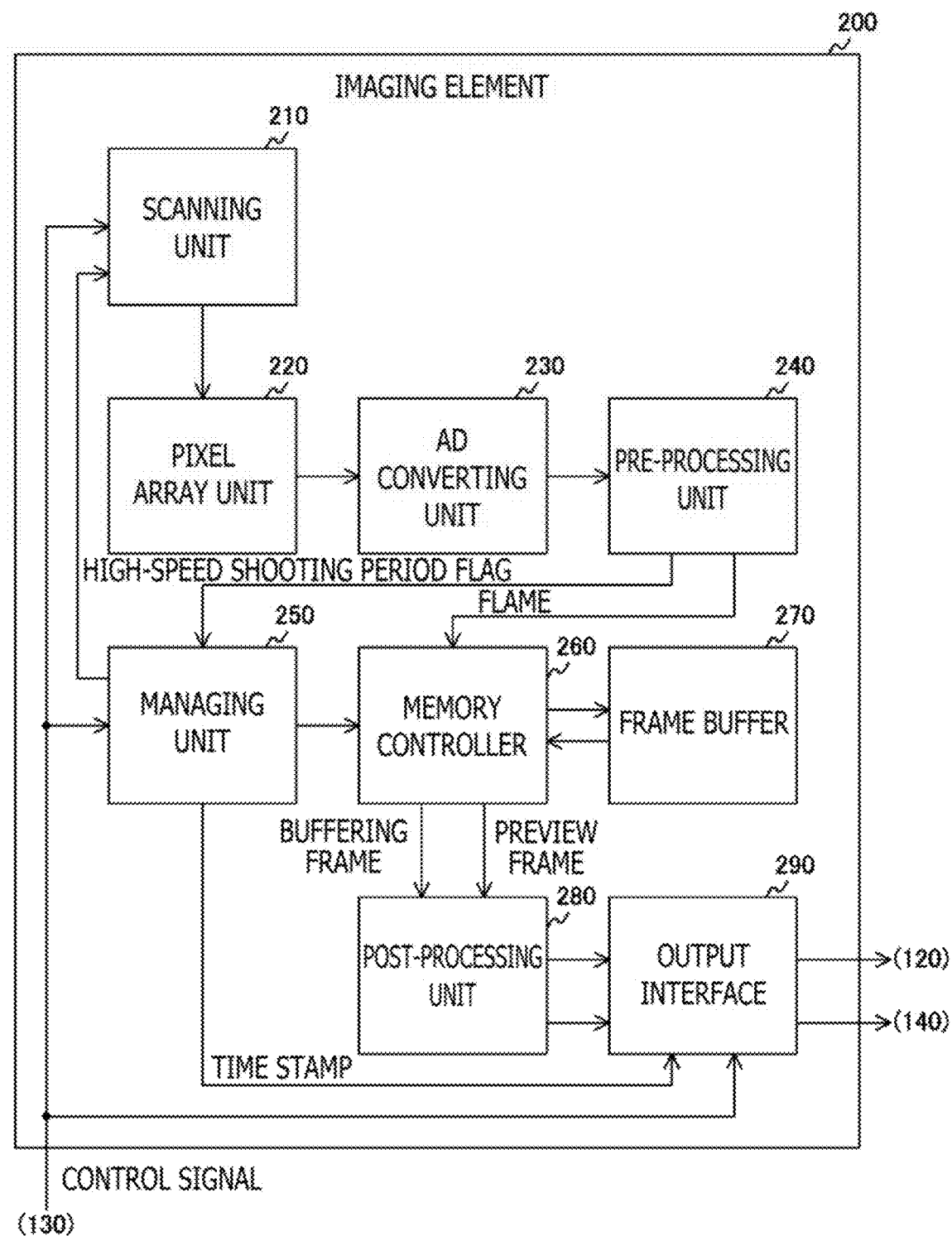
FIG. 2 is a block diagram depicting an example of the configuration of an imaging element in the first embodiment of the present technique.

FIG. 2 is a block diagram depicting an example of the configuration of the imaging element 200 in the first embodiment. The imaging element 200 includes a scanning unit 210, a pixel array unit 220, an AD (Analog to Digital) converting unit 230, a pre-processing unit 240, and a managing unit 250. The imaging element 200 further includes a memory controller 260, a frame buffer 270, a post-processing unit 280, and an output interface 290.

The scanning unit 210 is a component that drives the pixel array unit 220. The scanning unit 210 starts driving the pixel array unit 220 in accordance with a control signal from the control unit 130. This control signal includes, for example, a signal that indicates whether the imaging apparatus 100 is in the preview mode or the shooting mode.

The pixel array unit 220 is a component that produces an image signal. The pixel array unit 220 has plural pixels arranged therein in a two-dimensional grid. Each of the pixels produces an analog pixel signal. The pixel array unit 220 supplies an analog image signal including these pixel signals to the AD converting unit 230.

In addition, a circuit including the scanning unit 210 and the pixel array unit 220 is an example of an image producing unit described in the claims.

The AD converting unit 230 is a component that converts the image signal into digital image data (frame). The AD converting unit 230 supplies the produced frame to the pre-processing unit 240.

The pre-processing unit 240 is a component that executes a predetermined process for the frame as a pre-process. The pre-processing unit 240 supplies the frame after undergoing the pre-process to the memory controller 260. Furthermore, in the pre-process, the pre-processing unit 240 detects a change of the scene in the moving image and sets a specific period including the timing of the change as a high-speed shooting period. The pre-processing unit 240 thereafter produces a high-speed shooting period flag that indicates whether or not the present time point is in the high-speed shooting period, and supplies the high-speed shooting period flag to the managing unit 250. The high-speed shooting period flag is, for example, set to be in an ON-state during the high-speed shooting period and set to be in an OFF-state during any period other than the high-speed shooting period.

The managing unit 250 is a component that manages the overall imaging element 200. In the high-speed shooting period, the managing unit 250 controls the scanning unit 210 to cause the pixel array unit 220 to drive in the high-speed shooting mode when an empty area is present in the frame buffer 270. On the other hand, in the case where no empty area is present, or outside the high-speed shooting period, the managing unit 250 causes the pixel array unit 220 to drive in the normal shooting mode.

Furthermore, in the high-speed shooting mode, the managing unit 250 supplies a write address to the memory controller 260 and causes the frame buffer 270 to retain the frame. Furthermore, the managing unit 250 produces, for each frame, a time stamp that indicates the reproduction time of frame, and supplies the time stamp to the output interface 290. Thereafter, in the preview mode, the managing unit 250 supplies a read address to the memory controller 260 and causes the memory controller 260 to execute extraction of the frame from the frame buffer 270.

The memory controller 260 is a component that controls the frame buffer 270. When the write address is supplied from the managing unit 250, the memory controller 260 stores the frame at this address as a buffering frame. When the read address is thereafter supplied from the managing unit 250, the memory controller 260 reads the buffering frame from this address and supplies the buffering frame to the post-processing unit 280. Furthermore, the memory controller 260 supplies the frame at a low frame rate from the pre-processing unit 240 to the post-processing unit 280 as a preview frame.

The frame buffer 270 is a component that retains the frame. For example, a DRAM (Dynamic Random Access Memory) is used as the frame buffer 270. In addition, the frame buffer 270 is an example of a buffer described in the claims.

The post-processing unit 280 is a component that executes a predetermined process as a post-process for the buffering frame and the preview frame from the memory controller 260. The post-processing unit 280 supplies the frame after undergoing the post-process to the output interface 290.

The output interface 290 is a component that outputs the frame. In the preview mode, the output interface 290 outputs the preview frame to the displaying unit 120 and outputs the buffering frames to the recording unit 140. On the other hand, in the shooting mode, the output interface 290 outputs the preview frame to the displaying unit 120 and the recording unit 140. In addition, the output interface 290 is an example of an output unit described in the claims.

[Example of Configuration of Pre-Processing Unit]

Figure 3:
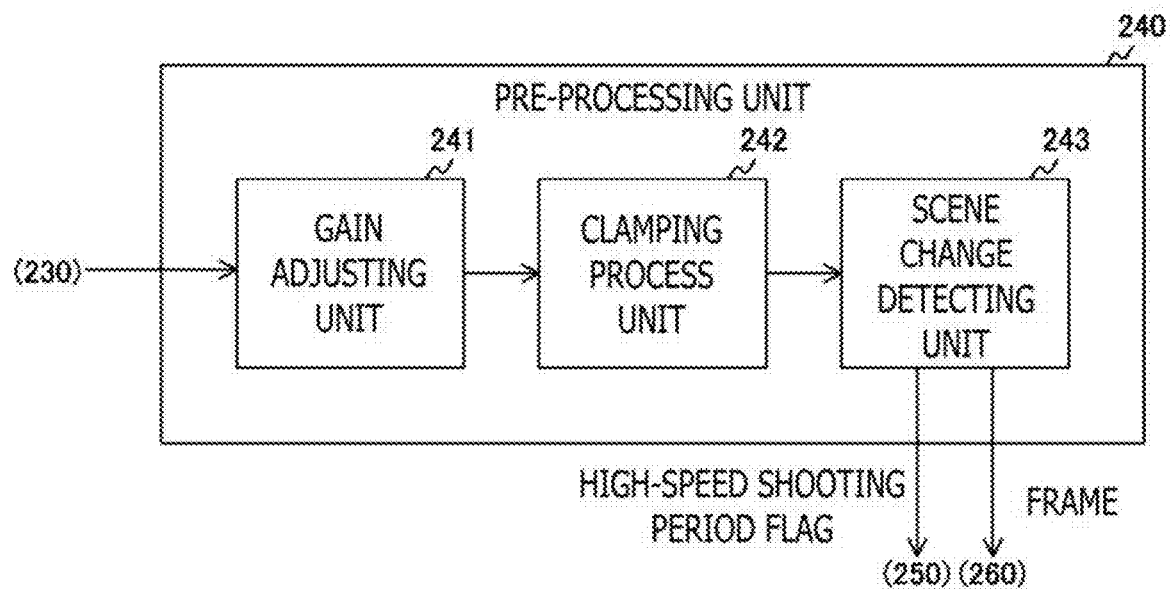
FIG. 3 is a block diagram depicting an example of the configuration of a pre-processing unit in the first embodiment of the present technique.

FIG. 3 is a block diagram depicting an example of the configuration of the pre-processing unit 240 in the first embodiment. The pre-processing unit 240 includes a gain adjusting unit 241, a clamping process unit 242, and a scene change detecting unit 243.

The gain adjusting unit 241 is a component that adjusts the level of pixel data using a predetermined gain. The gain adjusting unit 241 supplies the pixel data after being adjusted, to the clamping process unit 242.

The clamping process unit 242 is a component that executes a clamping process of fixing the black level of the pixel data. The clamping process unit 242 supplies the pixel data after undergoing the clamping process, to the scene change detecting unit 243.

The scene change detecting unit 243 is a component that detects presence or absence of a change of the scene. The scene change detecting unit 243 compares consecutive plural frames with each other and detects presence or absence of any change of the scene. The scene change detecting unit 243 thereafter sets a specific period including the timing at which the scene changes, as the high-speed shooting period and produces the high-speed shooting period flag. The scene change detecting unit 243 supplies the high-speed shooting period flag to the managing unit 250 and supplies the frame to the memory controller 260.

In addition, the pre-processing unit 240 executes the gain adjustment process, the clamping process, and the scene change detection while the pre-processing unit 240 may be configured to avoid executing any one or more of these. Furthermore, the pre-processing unit 240 may further execute processes other than these. Furthermore, the imaging element 200 already transitions into the high-speed shooting mode when any change of the scene is detected while the imaging element 200 may transition into the high-speed shooting mode in accordance with an operation of a user. In this case, the pre-processing unit 240 does not need to detect any change of the scene. Furthermore, the scene change detecting unit 243 may refer to the frames accumulated in the frame buffer during the high-speed shooting and may select the frame to be output, based on a motion of the object. In this case, all of the buffered frames are not always output and only the frames in a section with a hard motion of the buffered frames are output by the output interface 290. The frames that are not output, of the buffered frames are deleted or overwritten on.

[Example of Configuration of Frame Buffer]

Figure 4:
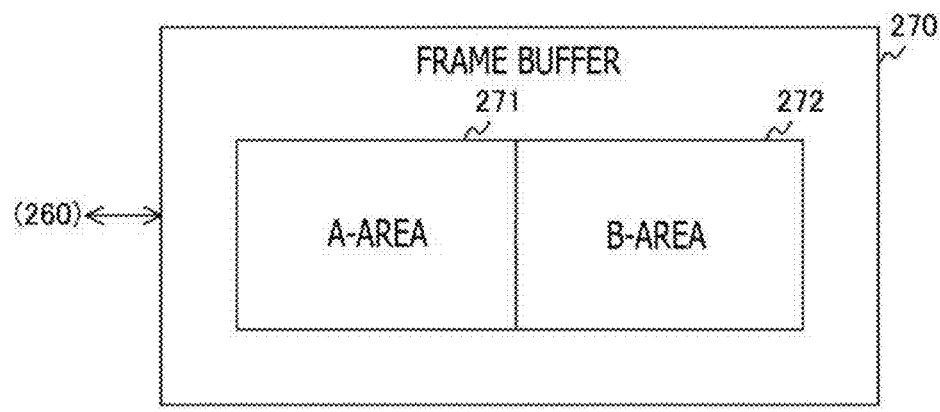
FIG. 4 is a diagram depicting an example of the configuration of a frame buffer in the first embodiment of the present technique.

FIG. 4 is a diagram depicting an example of the configuration of the frame buffer 270 in the first embodiment. The frame buffer 270 includes an A-area 271 and a B-area 272. The respective A-area 271 and B-area 272 can retain N (N is an integer) frames.

[Example of Configuration of Managing Unit]

Figure 5:
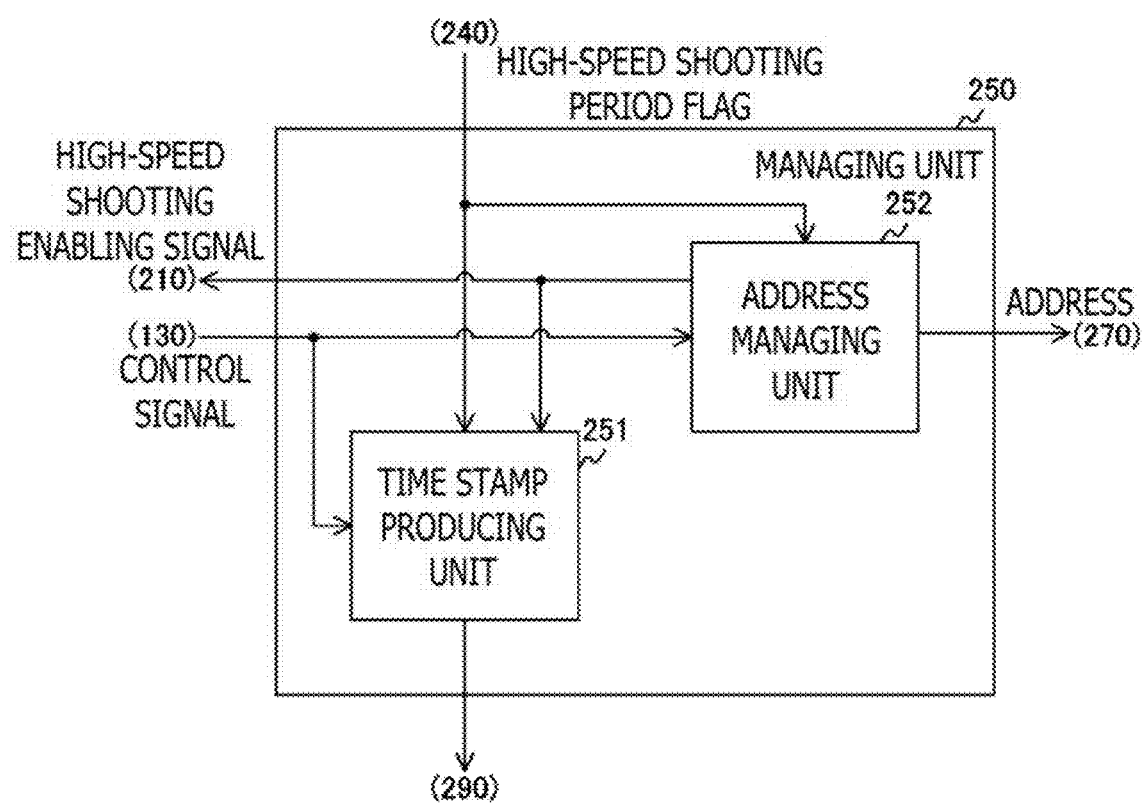
FIG. 5 is a block diagram depicting an example of the configuration of a managing unit in the first embodiment of the present technique.

FIG. 5 is a block diagram depicting an example of the configuration of the managing unit 250 in the first embodiment. The managing unit 250 includes a time stamp producing unit 251 and an address managing unit 252.

The address managing unit 252 determines whether or not an empty capacity in either the A-area 271 or the B-area 272 exceeds a predetermined threshold value in the high-speed shooting period. In the case where the address managing unit 252 determines that an empty capacity exceeding the threshold value is present, the address managing unit 252 sets a high-speed shooting enabling signal to be "enable" and causes the frame to be produced in the high-speed shooting mode. Concerning the above, the high-speed shooting enabling signal is a signal that instructs as to whether or not the pixel array unit 220 is driven at a high frame rate. Furthermore, in the case where the address managing unit 252 determines that an empty capacity exceeding the threshold value is present in either of the areas, the address managing unit 252 produces an empty write address in the area and supplies the write address to the memory controller 260. This write address is produced every time a frame is produced, and the frame is retained in the frame buffer 270 in order of the production thereof.

Outside the high-speed shooting period or in the case where no empty capacity exceeding the threshold value is present even in the high-speed shooting period, the address managing unit 252 sets the high-speed shooting enabling signal to be "disable" and causes the frames to be produced in the normal shooting mode.

In the preview mode, the address managing unit 252 produces a read address at which buffering frame is retained, in order of the retention of the frame and supplies the read address to the memory controller 260. The frames are read in the order of their retention based on the read addresses. The memory controller 260 deletes the read frame, from the frame buffer 270.

The time stamp producing unit 251 is a component that produces a time stamp for each frame based on a scanning control signal and the high-speed shooting enabling signal. The time stamp producing unit 251 supplies the produced stamp to the output interface 290. The time stamp is attached to the corresponding frame in the output interface 290.

[Example of Configuration of Post-Processing Unit]

Figure 6:
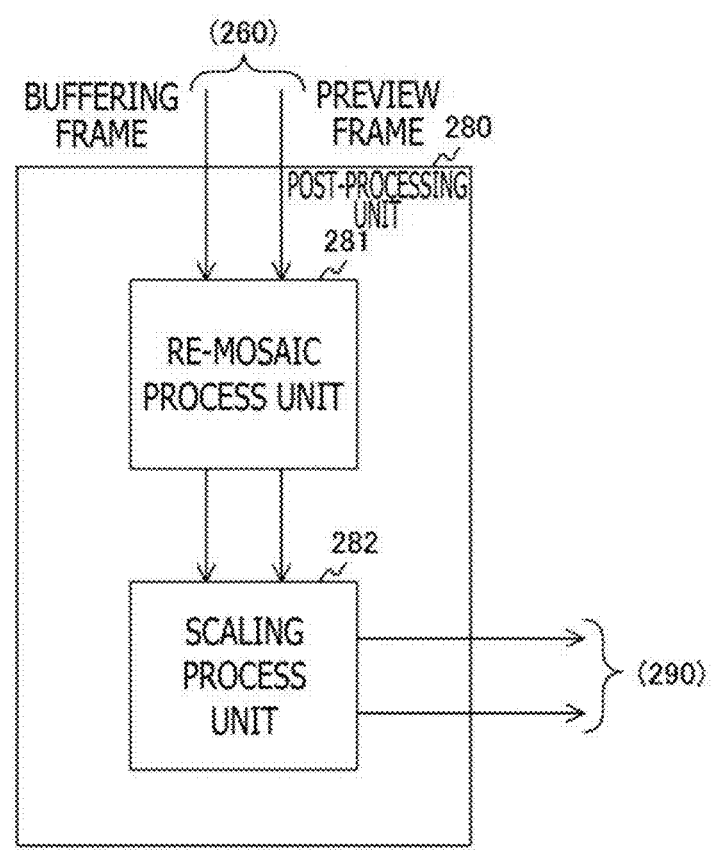
FIG. 6 is a block diagram depicting an example of the configuration of a post-processing unit in the first embodiment of the present technique.

FIG. 6 is a block diagram depicting an example of the configuration of the post-processing unit 280 in the first embodiment. The post-processing unit 280 includes a re-mosaic process unit 281 and a scaling process unit 282.

The re-mosaic process unit 281 is a component that executes a re-mosaic process for the respective buffering frame and preview frame. The re-mosaic process unit 281 supplies the frames after undergoing the re-mosaic process to the scaling process unit 282.

The scaling process unit 282 is a component that executes a scaling process of changing the size of a frame. The scaling process unit 282 supplies the frame after undergoing the scaling process to the output interface 290.

In addition, the post-processing unit 280 executes the re-mosaic process and the scaling process while the post-processing unit 280 may be configured not to execute either of these processes. The post-processing unit 280 may further execute processes other than these processes (such as a defect correction process).

Figure 7:
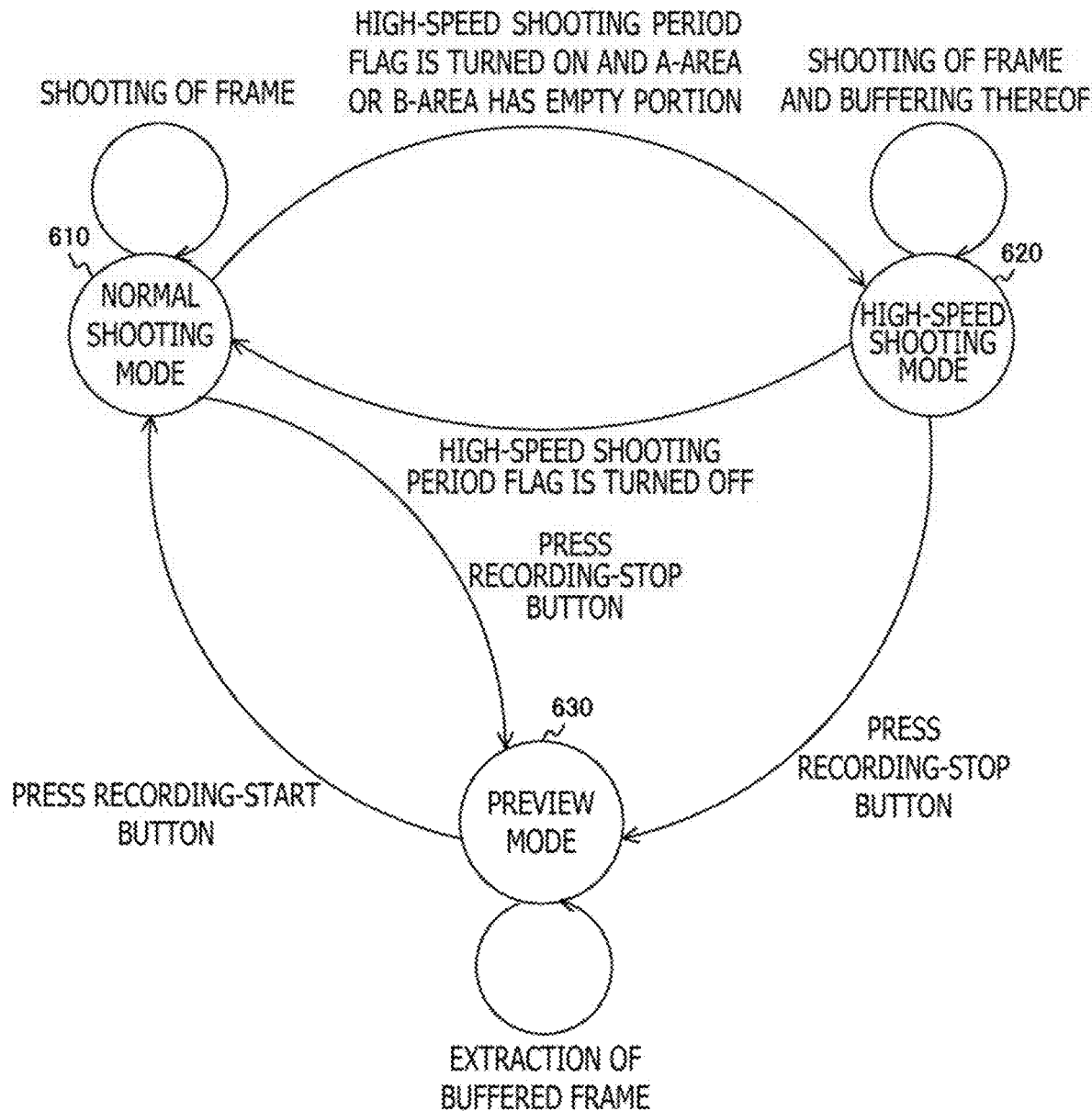
FIG. 7 is an example of a state transition diagram for the imaging apparatus in the first embodiment of the present technique.

FIG. 7 is an example of the state transition diagram for the imaging apparatus 100 in the first embodiment. The states of the imaging apparatus 100 include a normal shooting mode 610, a high-speed shooting mode 620, and a preview mode 630.

The imaging apparatus 100 transitions into the preview mode 630 when the power source thereof is turned on. In the preview mode 630, the imaging apparatus 100 extracts the buffering frame from the frame buffer 270 at a frame rate lower than that of the high-speed shooting mode (such as 30 fps) and stores the buffering frame in the recording unit 140. Furthermore, the imaging apparatus 100 produces a preview frame at a frame rate lower than that of the high-speed shooting mode (such as 30 fps) and displays the preview frame.

When the recording start button is thereafter pressed down in the preview mode 630, the imaging apparatus 100 transitions into the normal shooting mode 610. In the normal shooting mode 610, the imaging apparatus 100 shoots and displays a preview frame at a frame rate lower than that of the high-speed shooting mode (such as 30 fps) and concurrently records the preview frame.

In the normal shooting mode 610, the high-speed shooting period flag is thereafter set to be in the ON-state and, when an empty portion is present in the A-area or the B-area, the imaging apparatus 100 transitions into the high-speed shooting mode 620. In this high-speed shooting mode, the imaging apparatus 100 shoots a frame at a frame rate higher than that of the normal shooting mode (such as 960 fps) and buffers the frame. Furthermore, the imaging apparatus 100 displays the preview frame at a low frame rate (such as 30 fps).

Furthermore, in the high-speed shooting mode 620, when the high-speed shooting period flag is set to be in the OFF-state, the imaging apparatus 100 transitions into the normal shooting mode 610. Concerning the above, the duration of the high-speed shooting period is set to be a value to the extent that the area for the buffering does not overflow. For example, 960 frames can be retained in the respective A-area and B-area and, in the case where the high-speed shooting is executed at 960 fps, a period not exceeding one second is set as the high-speed shooting period.

Furthermore, in the normal shooting mode 610 and the high-speed shooting mode 620, when a recording stop button is pressed down, the imaging apparatus 100 transitions into the preview mode 630.

In addition, the imaging apparatus 100 starts the extraction of the buffering frame when the recording is stopped while the imaging apparatus 100 may start the extraction of the buffering frame when the displaying of the preview frame is stopped. In this case, for example, a preview stop mode is further added. When a button to display a set screen is pressed down or when a period that has no operation executed therein and whose duration is a specific time period or longer elapses, the imaging apparatus 100 transitions into the preview stop mode. In the preview stop mode, the imaging apparatus 100 stops the shooting and the displaying of the preview frame and extracts the buffering frame.

Figure 8:
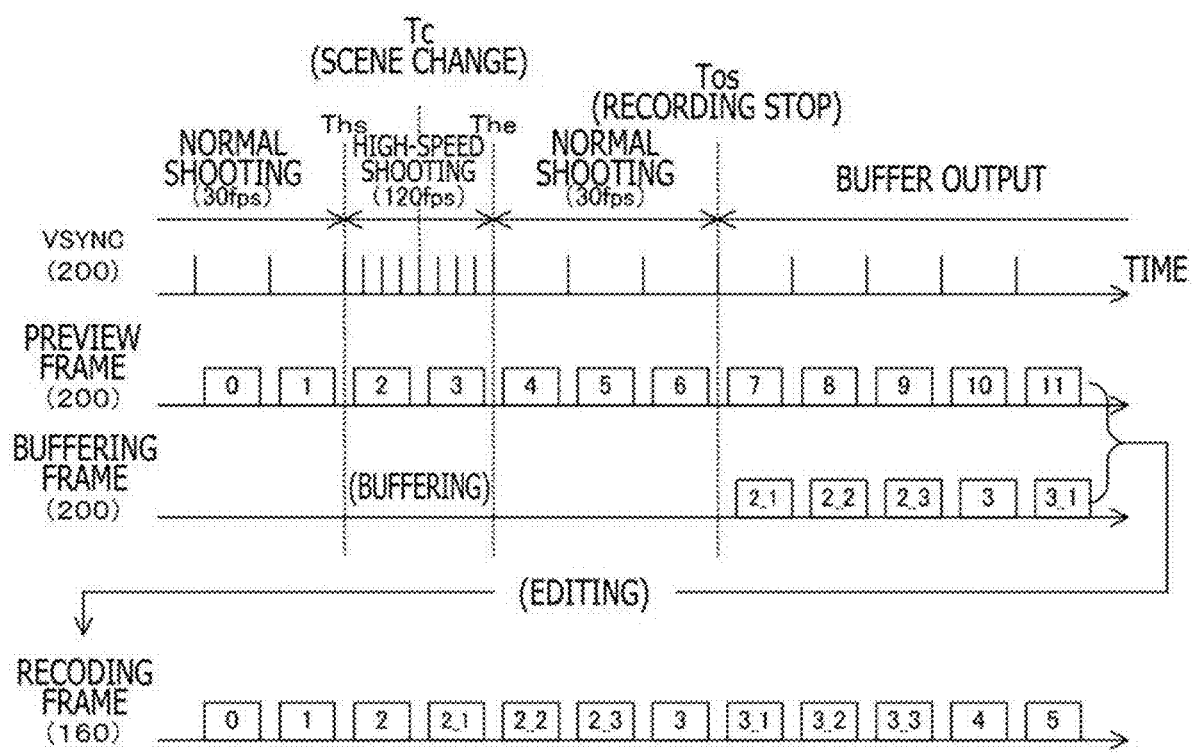
FIG. 8 is a timing chart depicting an example of an operation of the imaging apparatus in the first embodiment of the present technique.

FIG. 8 is a timing chart depicting an example of an operation of the imaging apparatus 100 in the first embodiment. When the recording start button is pressed down, the imaging apparatus 100 produces a preview frame every time a cycle of a synchronization signal such as a vertical synchronization signal VSYNC elapses. The vertical synchronization signal VSYNC is a cyclic signal that indicates the timing to produce a frame. The imaging apparatus 100 thereafter displays and records a preview frame.

When the scene changes at a timing Tc, a period spanning from Ths to The and including this timing is set as the high-speed shooting period. In this period, the imaging apparatus 100 produces and buffers a frame every time a cycle shorter than that of the normal shooting elapses. Furthermore, the imaging apparatus 100 displays and records the preview frame every time a cycle equal to that of the normal shooting elapses.

When the high-speed shooting period elapses, the imaging apparatus 100 produces, displays, and records the preview frame every time the cycle of the vertical synchronization signal VSYNC elapses.

Following the above, after an operation of "recording stop" is executed at a timing Tos, the imaging apparatus 100 produces and displays the preview frame every time the cycle of the vertical synchronization signal VSYNC elapses. Furthermore, the imaging apparatus 100 extracts the buffering frame from the frame buffer 270 and records the buffering frame in the recording unit 140 every time the cycle of the vertical synchronization signal VSYNC elapses.

The application executing unit 150 thereafter refers to the time stamp of the respective recorded preview frames and recorded buffering frames, and establishes recording frames by transposing these frames to be in order of their shooting. For example, the case is assumed where the high-speed shooting is executed at 120 fps in 1/15 second from the time when a "second" preview frame is shot to the time when a "fourth" preview frame is shot. In this case, seven frames of "2_1," "2_2," "2_3," "3," "3_1," "3_2," and "3_3" are buffered. The application executing unit 150 deletes the buffering frame of "3" that overlaps with that of the preview frames and inserts the buffering frames of "2_1," "2_2," and "2_3," between the preview frames of "2" and "3." Furthermore, the application executing unit 150 inserts the buffering frames of "3_1," "3_2," and "3_3," between the preview frames of "3" and "4."

In addition, the imaging element 200 also buffers the frames that overlap with the preview frames, as buffering frames during the high-speed shooting while the imaging element 200 may be configured to buffer no overlapping frames. In this case, for example, because the frame of "3" of "2_1," "2_2," "2_3," "3," "3_1," "3_2," and "3_3" overlaps, the frame of "3" is not retained. The duration time of the high-speed shooting can thereby be extended. In this case, the application executing unit 150 does not need to delete any buffering frame that overlaps with any of the preview frames.

As exemplified in FIG. 8, when the recording is stopped, the imaging element 200 outputs the buffering frame synchronizing with the vertical synchronization signal VSYNC and concurrently outputs also the preview frame. The displaying unit 120 can thereby continue displaying the preview frame without any discontinuation even during the output of the buffering frame.

Concerning the above, assuming that, when the recording is stopped, the imaging element 200 discontinues the production of the preview frame and outputs only the buffering frame, the display of the preview frame is discontinued and difficulty arises in the next shooting. In contrast, because the imaging element 200 outputs the buffering frame and concurrently outputs also the preview frame, the displaying unit 120 can continue the display of the preview frame.

Figure 9:
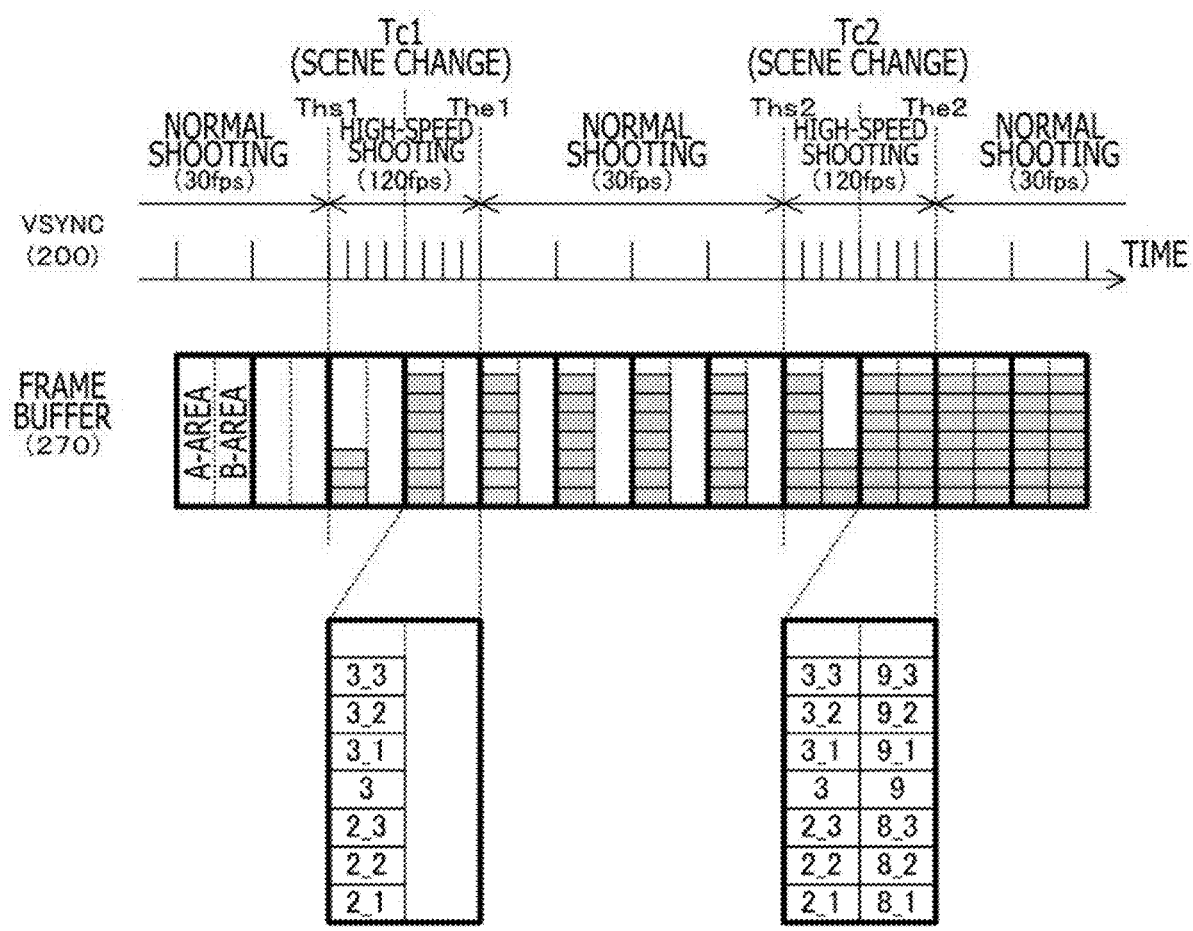
FIG. 9 is a diagram depicting an example of variation of a capacity of the frame buffer during shooting in the first embodiment of the present technique.

FIG. 9 is a diagram depicting an example of variation of a capacity of the frame buffer 270 when shooting is executed in the first embodiment. When the scene changes at a timing Tc1, a period from Ths1 to The1 including this timing is set as a high-speed shooting period. At the timing Ths1, the imaging apparatus 100 starts the high-speed shooting because the A-area and the B-area are empty. During the period up to a timing The1, the imaging apparatus 100 buffers the frames in the A-area.

After a timing Tse1, when the scene changes at a timing Tc2, the period from Ths2 to The2 including the timing is set as a second high-speed shooting period. At the timing Ths2, the imaging apparatus 100 starts high-speed shooting because the B-area is empty. During the period up to the timing The2, the imaging apparatus 100 buffers the frames in the B-area.

Figure 10:
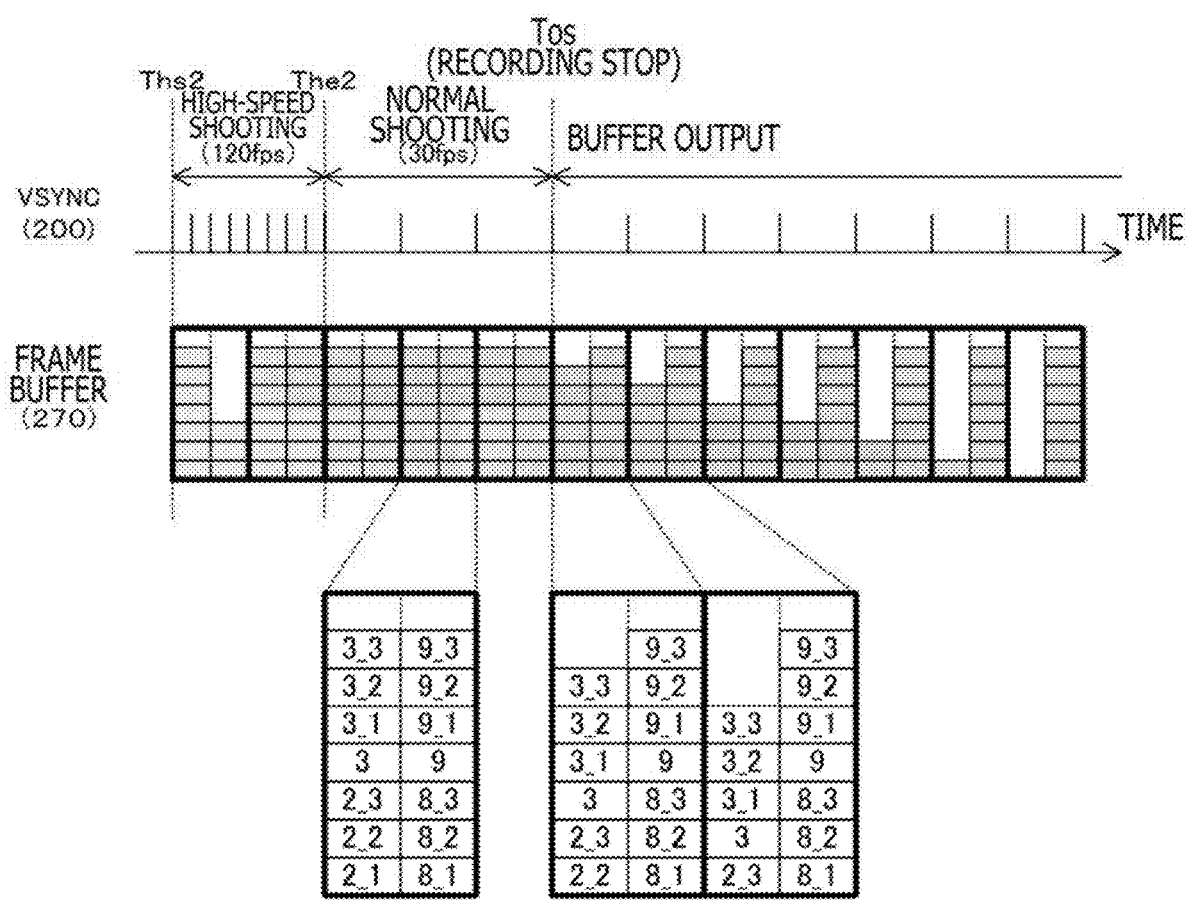
FIG. 10 is a diagram depicting an example of variation of the capacity of the frame buffer after the shooting comes to an end in the first embodiment of the present technique.

FIG. 10 is a diagram depicting an example of variation of the capacity of the frame buffer after the shooting comes to an end in the first embodiment. After the timing The2, when the operation of recording stop is executed at the timing Tos, the imaging element 200 extracts the buffering frames from the frame buffer 270 at the low frame rate and outputs the buffering frames to the recording unit 140.

Concerning the above, a configuration including the frame buffer 270 that is not divided into the A-area and the B-area is assumed as a comparative example. In this comparative example, no empty portion is present in the frame buffer 270 at the timing The1 at which the first session of the high-speed shooting comes to an end in FIG. 9. In the case where it is desired to start the second session of the high-speed shooting, the user has to press down the recording stop button, wait until an empty portion is present in the frame buffer 270, and thereafter again press down the recording start button. In this manner, the high-speed shooting cannot be consecutively executed in plural sessions in the comparative example.

In contrast, the imaging apparatus 100 can consecutively execute the high-speed shooting in plural sessions as exemplified in FIG. 9 and FIG. 10 by disposing two areas in the frame buffer 270 and starting the high-speed shooting in the case where an empty portion is present in any one of the two areas.

In addition, the two areas are disposed in the frame buffer 270 while three or more areas can be disposed therein. When the capacity of the frame buffer 270 is a specific capacity, the period of the high-speed shooting in one session becomes shorter while the number of the sessions to consecutively execute the high-speed shooting can be increased, as the number of the areas is increased.

Figure 11:
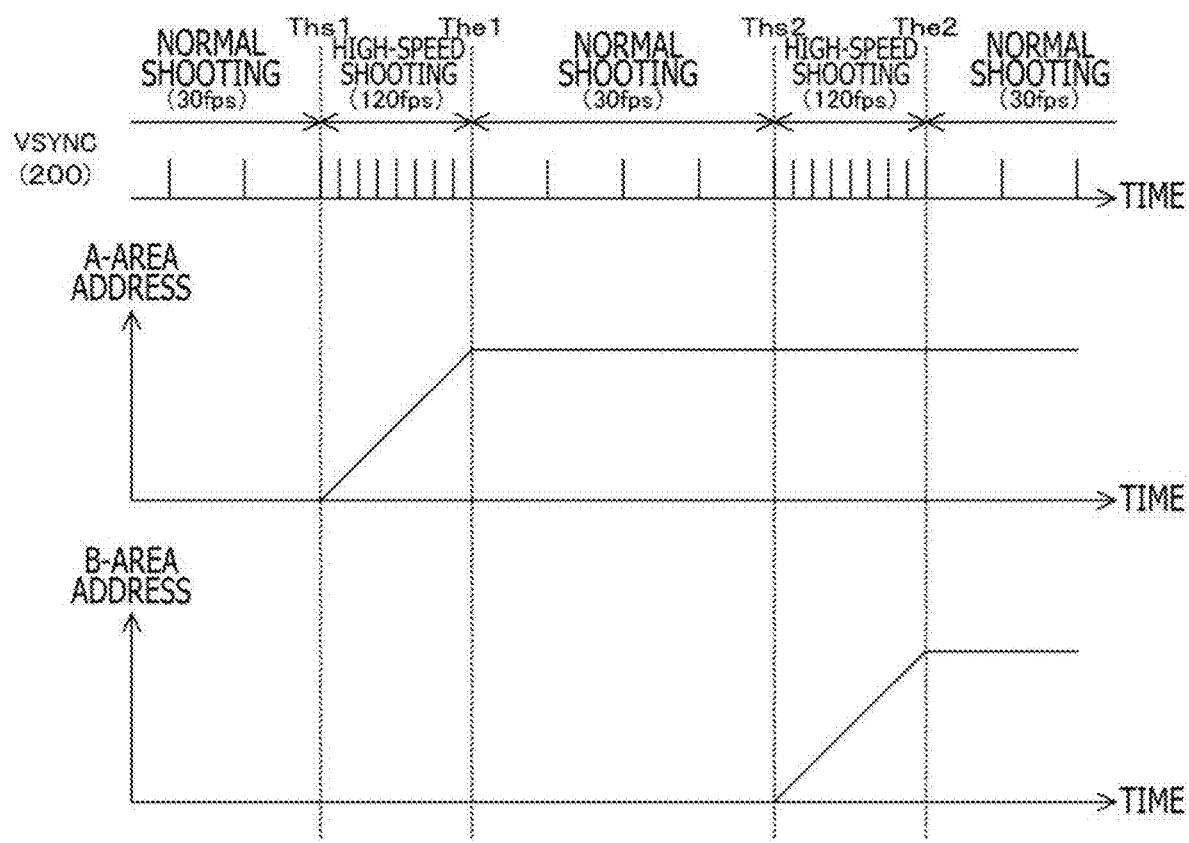
FIG. 11 is a graph depicting an example of variation of an access destination of each area in the first embodiment of the present technique.

FIG. 11 is a graph depicting an example of variation of an access destination of each area in the first embodiment. During the high-speed shooting in the first session, a write address indicating an address in the A-area is sequentially produced every time a frame is produced at the high frame rate, and the frame is retained at the address.

During the high-speed shooting in the second session, a write address indicating an address in the B-area is sequentially produced every time a frame is produced at the high frame rate, and the frame is retained at the address. When the recording thereafter comes to an end, the read address is produced in order of the retention and the frame is read.

[Example of Operation of Imaging Apparatus]

Figure 12:
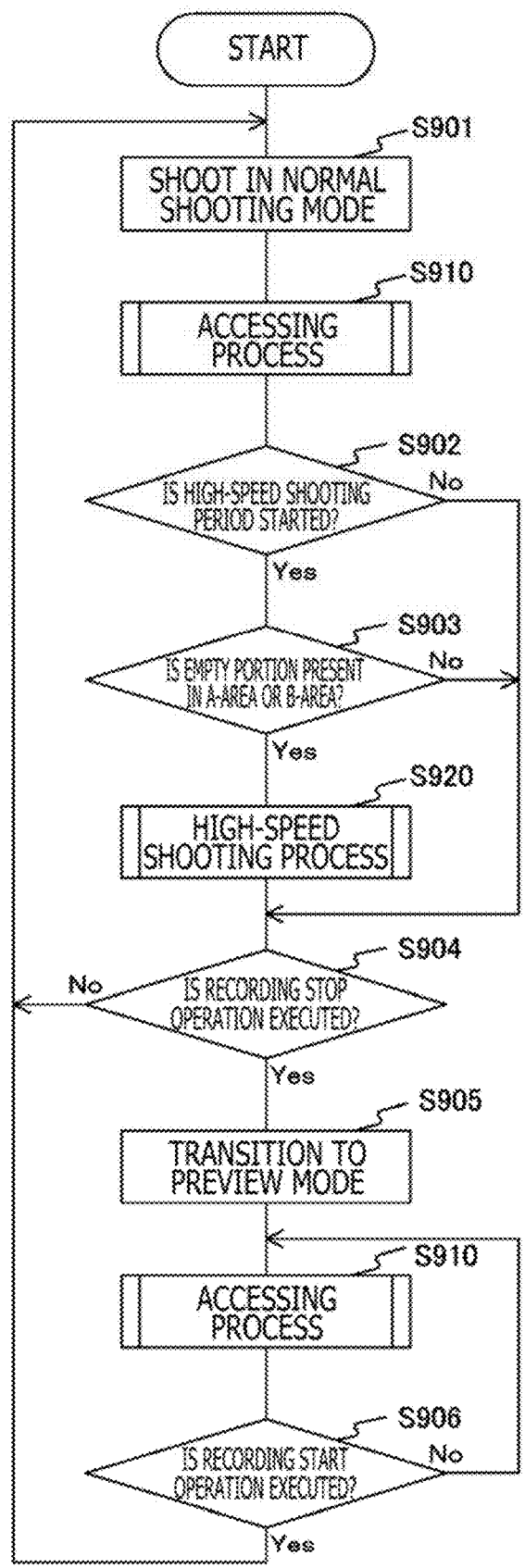
FIG. 12 is a flowchart depicting an example of an operation of the imaging apparatus in the first embodiment of the present technique.

FIG. 12 is a flowchart depicting an example of an operation of the imaging apparatus 100 in the first embodiment. This operation is started, for example, when an operation of "recording start" is executed. The imaging apparatus 100 executes shooting in the normal shooting mode (step S901) and executes an accessing process of accessing the buffer 270 (step S910).

Then, the imaging apparatus 100 determines whether or not the high-speed shooting period is started (step S902). In the case where the imaging apparatus 100 determines that the high-speed shooting period is started (step S902: Yes), the imaging apparatus 100 determines whether or not any empty portion is present in either the A-area or the B-area (step S903).

In the case where the imaging apparatus 100 determines that an empty portion is present in either the A-area or the B-area (step S903: Yes), the imaging apparatus 100 executes a high-speed shooting process of shooting at the high frame rate (step S920).

In the case where the imaging apparatus 100 determines that the high-speed shooting period is not started (step S902: No), in the case where the imaging apparatus 100 determines that no empty portion is present in either the A-area or the B-area (step S903: No), or after step S920, the imaging apparatus 100 determines whether or not the operation of recording stop is executed (step S904).

In the case where the imaging apparatus 100 determines that the operation of recording stop is executed (step S904: Yes), the imaging apparatus 100 transitions into the preview mode (step S905) and executes the accessing process (step S910). The imaging apparatus 100 thereafter determines whether or not the operation of recording start is executed (step S906).

In the case where the imaging apparatus 100 determines that the operation of recording start is not executed (step S906: No), the imaging apparatus 100 repeatedly executes step S910. On the other hand, in the case where the imaging apparatus 100 determines that the operation of recording start is executed (step S906: Yes), the imaging apparatus 100 repeatedly executes steps S901 and thereafter.

Figure 13:
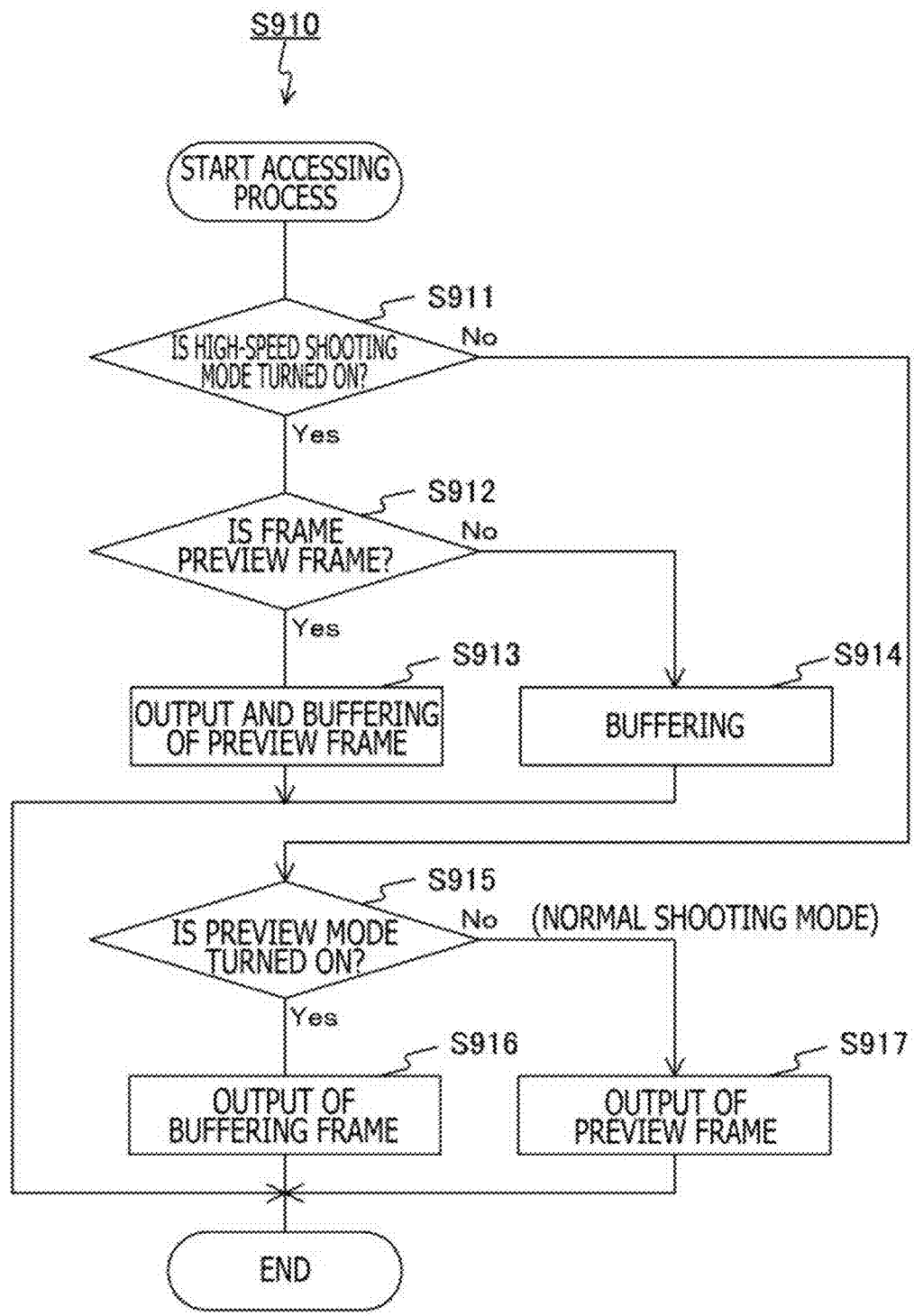
FIG. 13 is a flowchart depicting an example of an accessing process in the first embodiment of the present technique.

FIG. 13 is a flowchart depicting an example of the accessing process in the first embodiment. The imaging element 200 determines whether or not the high-speed shooting mode used (step S911). In the case where the imaging element 200 determines that the high-speed shooting mode is used (step S911: Yes), the imaging element 200 determines whether or not the produced frame is a preview frame (step S912). In the case where the imaging element 200 determines that the produced frame is a preview frame (step S912: Yes), the imaging element 200 outputs the preview frame and concurrently buffers the preview frame as a buffering frame (step S913).

On the other hand, in the case where the imaging element 200 determines that the produced frame is not a preview frame (step S912: No), the imaging element 200 buffers the frame as a buffering frame (step S914).

In the case where the imaging element 200 determines that the high-speed shooting mode is not used (step S911: No), the imaging element 200 determines whether or not the preview mode is used (step S915). In the case where the imaging element 200 determines that the preview mode is used (step S915: Yes), the imaging element 200 outputs the buffering frame (step S916).

Furthermore, in the case where the imaging element 200 determines that the normal shooting mode is used (step S915: No), the imaging element 200 outputs the preview frame (step S917). The imaging element 200 causes the accessing process to come to an end after steps S913, S914, S916, or S917.

Figure 14:
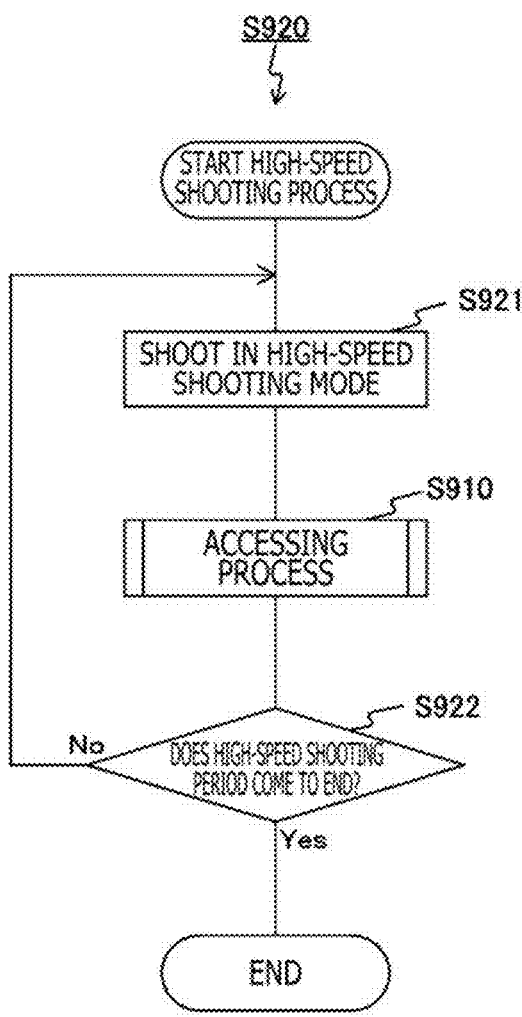
FIG. 14 is a flowchart depicting an example of a high-speed shooting process in the first embodiment of the present technique.

FIG. 14 is a flowchart depicting an example of the high-speed shooting process in the first embodiment. The imaging apparatus 100 shoots in the high-speed shooting mode (step S921) and executes the accessing process (S910). The imaging apparatus 100 thereafter determines whether or not a high-speed shooting period comes to an end (step S922). In the case where the imaging apparatus 100 determines that the high-speed shooting period does not yet come to an end (step S922: No), the imaging apparatus 100 repeatedly executes steps S921 and thereafter. On the other hand, in the case where the imaging apparatus 100 determines that the high-speed shooting period comes to an end (step S922: Yes), the imaging apparatus 100 causes the high-speed shooting process to come to an end.

As above, according to the first embodiment of the present technique, when an empty portion is present in any of the plural areas in the frame buffer 270, the imaging element 200 starts the high-speed shooting and can therefore execute the high-speed shooting consecutively in plural sessions.

[First Modification Example]

In the above first embodiment, the imaging element 200 outputs each one buffering frame every time a cycle of the vertical synchronization signal VSYNC elapses. The time period necessary for an empty portion to be established in the frame buffer 270 however becomes longer as the number of the buffering frames becomes larger. The imaging element 200 of a first modification example of the first embodiment differs from that of the first embodiment in that the time period for the empty portion to be established in the frame buffer is reduced.

Figure 15:
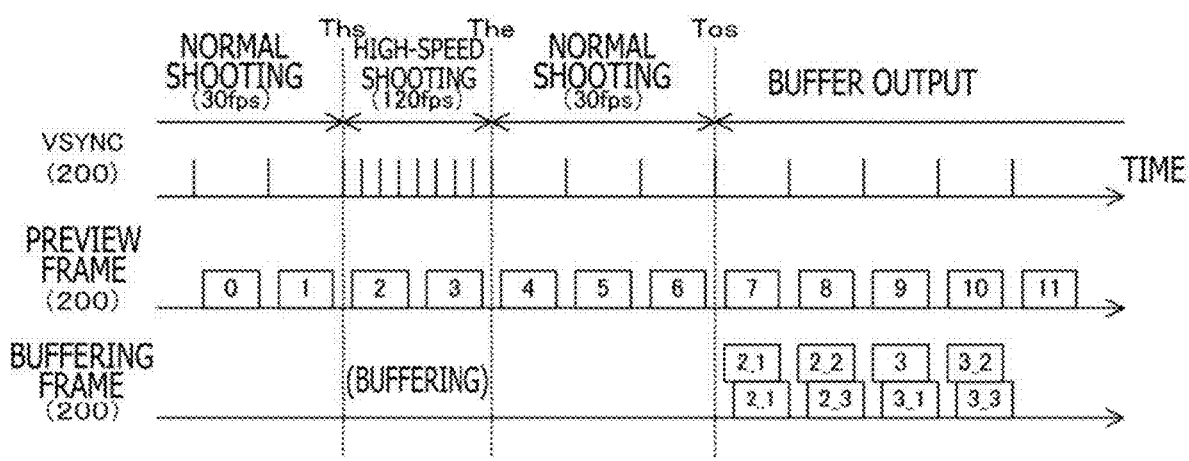
FIG. 15 is a timing chart depicting an example of an operation of an imaging element in a first modification example of the first embodiment of the present technique.

FIG. 15 is a timing chart depicting an example of an operation of an imaging element 200 in the first modification example of the first embodiment. The imaging element 200 of the first modification example differs from that of the first embodiment in that the imaging element 200 outputs two buffering frames at one time every time a cycle of the vertical synchronization signal VSYNC elapses in the preview mode. In addition, the imaging element 200 may output three or more frames every time a cycle of the vertical synchronization signal VSYNC elapses.

As above, according to the first modification example of the first embodiment of the present technique, the imaging element 200 outputs plural frames of the buffering frames every time a cycle of the vertical synchronization signal elapses and the time period for any empty portion to be established in the frame buffer 270 can therefore be reduced.

[Second Modification Example]

In the above first embodiment, the imaging element 200 outputs the buffering frames when the operation of recording stop is executed. With this configuration, when no empty portion is present in the frame buffer 270, the next high-speed shooting cannot be started as far as the recording is not stopped. The imaging element 200 in the second modification example of the first embodiment differs from that of the first embodiment in that an empty area is produced in the frame buffer 270 during the recording.

Figure 16:
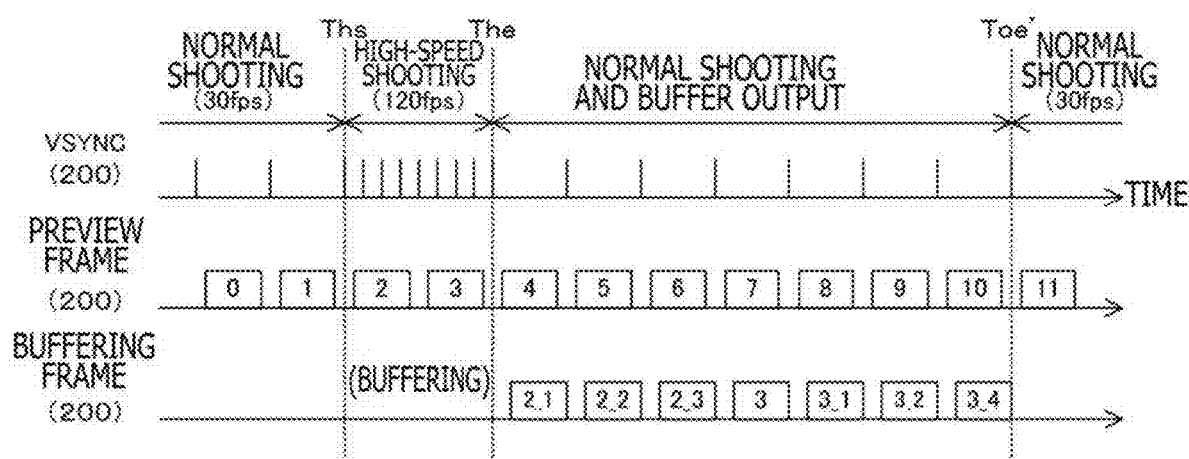
FIG. 16 is a timing chart depicting an example of an operation of an imaging element in a second modification example of the first embodiment of the present technique.

FIG. 16 is a timing chart depicting an example of an operation of an imaging element 200 in the second modification example of the first embodiment. The imaging element 200 of the second modification example differs from that of the first embodiment in that the imaging element 200 outputs a buffering frame every time a cycle of the vertical synchronization signal VSYNC elapses in the normal shooting mode. An empty area can thereby be produced in the frame buffer 270 during the recording.

As above, according to the second modification example of the first embodiment of the present technique, the imaging element 200 outputs the buffering frames during the recording in the normal shooting mode and an empty area can therefore be produced in the frame buffer 270 even without stopping the recording.

2. Second Embodiment

In the above first embodiment, the imaging element 200 does not output the preview frames and the buffering frames in the order of their shooting. The application executing unit 150 therefore needs to execute an editing process of transposing these frames into the order of their shooting, and the processing amount of the application executing unit 150 is increased as the recording time period is increased. An imaging apparatus 100 of a second embodiment differs from that of the first embodiment in that the processing amount of the application executing unit 150 is reduced.

Figure 17:
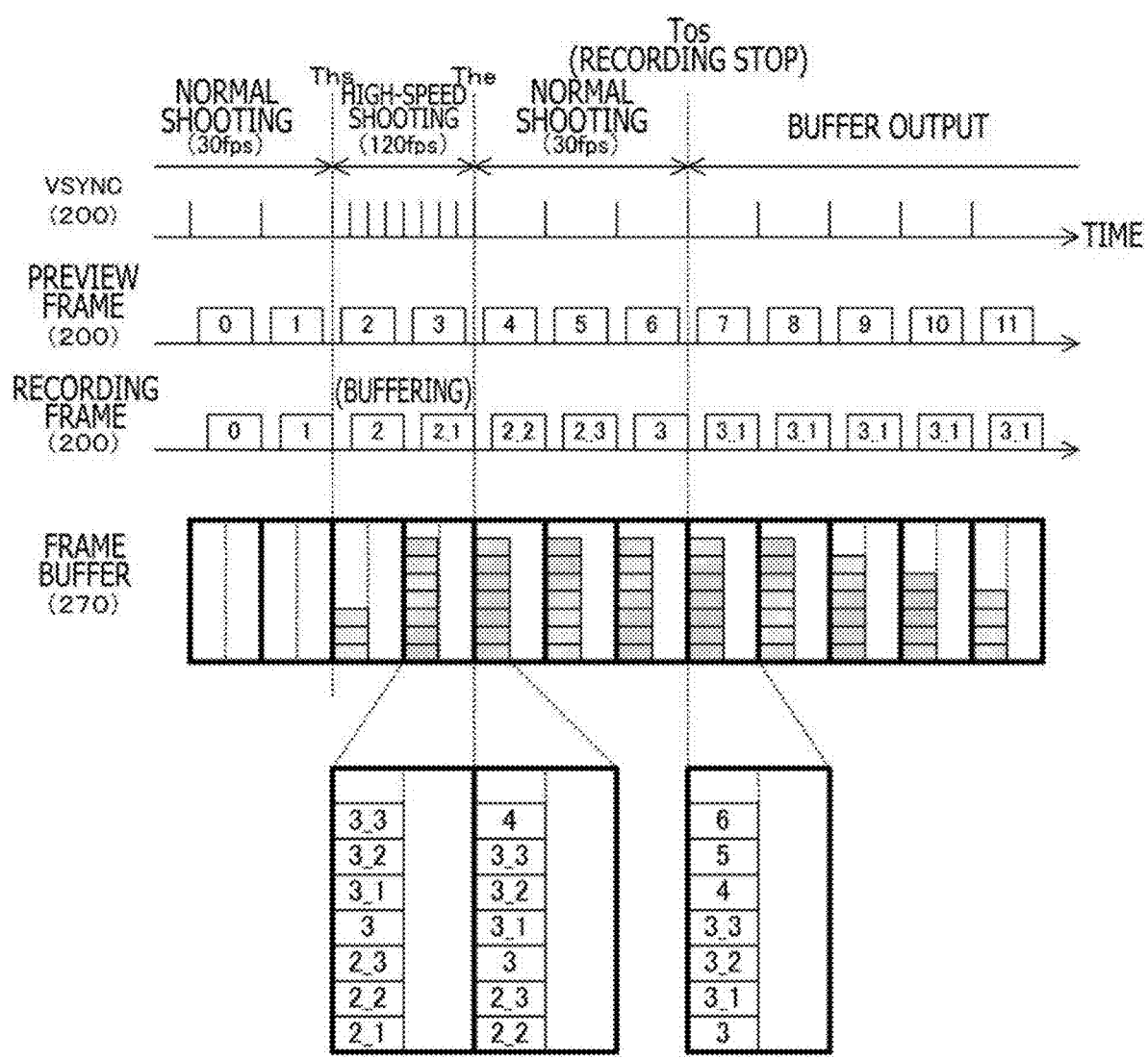
FIG. 17 is a timing chart depicting an example of an operation of an imaging apparatus in a second embodiment of the present technique.

FIG. 17 is a timing chart depicting an example of an operation of an imaging apparatus 100 in the second embodiment. In the normal shooting mode, synchronizing with the vertical synchronization signal VSYNC, the imaging element 200 shoots a frame and outputs the frame to the displaying unit 120 as a preview frame, and outputs the frame also to the recording unit 140 as a recording frame.

In the high-speed shooting mode, the imaging element 200 outputs the preview frame to the displaying unit 120 at a low frame rate. Furthermore, the imaging element 200 produces a frame at a high frame rate, retains the frame in the frame buffer 270, extracts the frame at the low frame rate in the order of its retention, and outputs the frame as the recording frame.

In the normal shooting mode after the high-speed shooting mode, the imaging element 200 retains a preview frame in the frame buffer 270 every time the imaging element 200 produces this preview frame. The imaging element 200 extracts the frame from the frame buffer 270 at the low frame rate and outputs the frame as the recording frame, in the order of its retention. Furthermore, the imaging element 200 outputs the preview frame to the displaying unit 120 at the low frame rate.

In the preview mode, the imaging element 200 thereafter extracts the frame from the frame buffer 270 and outputs the frame as the recording frame, at the low frame rate in the order of its retention until the frame buffer 270 becomes empty.

As above, according to the second embodiment of the present technique, the imaging element 200 retains the preview frame after the high-speed shooting, extracts the frame at the low frame rate in the order of its retention, outputs the frame as the recording frame, and can therefore output the recording frame in the order of its shooting. The application executing unit 150 therefore does not need to execute the process of transposing the recording frames into the order of their shooting, and the processing amount of the application executing unit 150 can be reduced.

In addition, the above embodiments each present an example to embody the present technique, and the matters in the embodiments and the matters specifying the invention in the claims respectively have correspondence relations therebetween. Similarly, the matters specifying the invention in the claims and the matters in the embodiments of the present technique that are given the identical names as those thereof respectively have correspondence relations therebetween. The present technique is however not limited to the embodiments and can be embodied by making various modifications to the embodiments within the scope not departing from the gist the present technique.

The process steps described in the above embodiments may be understood as a method that includes the series of steps and, furthermore, may be understood as a program to cause a computer to execute the series of steps or a recording medium that has the program stored therein. For example, a CD (Compact Disc), an MD (MiniDisc), a DVD (Digital Versatile Disc), a memory card, a Blu-ray disc (Blu-ray (registered trademark) Disc), or the like can be used as the recording medium.

It is noted that the effects described herein are not necessarily limited and any one effect described in the present disclosure may be achieved.

In addition, the present technique can also take the following configuration.

(1)
An imaging element including:
a buffer that has a plurality of areas disposed therein;
an image producing unit that produces an image in the case where an empty capacity of any of the plurality of areas exceeds a predetermined threshold value;
a managing unit that causes an area whose empty capacity exceeds the predetermined threshold value, of the plurality of areas to retain the image as a buffering image; and
an output unit that extracts the buffering image from the buffer and that outputs the buffering image, in order of the retention of the buffering image.

(2)
The imaging element described in the above (1), in which
the image producing unit produces the image as a preview image every time a predetermined cycle elapses in a predetermined normal shooting period and, in the case where an empty capacity of any of the plurality of areas exceeds the predetermined threshold value in a high-speed shooting period that is different from the predetermined normal shooting period, produces the image as a high-speed shooting image every time a cycle that is shorter than the predetermined cycle elapses, and
the managing unit causes the high-speed shooting image to be retained as the buffering image.

(3)
The imaging element described in the above (2), in which
the output unit further outputs the preview image together with the buffering image every time the predetermined cycle elapses.

(4)
The imaging element described in the above (2) or (4), in which
the managing unit causes the buffer to retain the preview image together with the buffering image, and
the output unit extracts the buffering image and the preview image from the buffer and outputs these images, in order of retention of these images.

(5)
The imaging element described in any one of the above (2) to (4), in which
the output unit extracts the buffering image from the buffer and outputs the buffering image when a predetermined operation is executed.

(6)
The imaging element described in any one of the above (2) to (5), in which
the output unit extracts the buffering image from the buffer and outputs the buffering image when the high-speed shooting period comes to an end.

(7)
The imaging element described in any one of the above (2) to (6), in which
the output unit extracts and outputs the plurality of buffering images every time the predetermined cycle elapses.

(8)
An imaging apparatus including:
a buffer that has a plurality of areas disposed therein;
an image producing unit that produces an image in the case where an empty capacity of any of the plurality of areas exceeds a predetermined threshold value;
a managing unit that causes an area whose empty capacity exceeds the predetermined threshold value, of the plurality of areas to retain the image as a buffering image;
an output unit that extracts the buffering image from the buffer and that outputs the buffering image, in order of the retention of the buffering image; and a recording unit that records the output image.

(9)
A control method for an imaging element, the control method including:
an image producing step of producing an image in the case where an empty capacity of any of a plurality of areas in a buffer that has the plurality of areas disposed therein exceeds a predetermined threshold value;
a managing step of causing an area whose empty capacity exceeds the predetermined threshold value, of the plurality of areas to retain the image as a buffering image; and
an output step of extracting the buffering image from the buffer and outputting the buffering image, in order of the retention of the buffering image.

REFERENCE SIGNS LIST

100 Imaging apparatus
110 Imaging lens
120 Displaying unit
130 Control unit
140 Recording unit
150 Application executing unit
160 Reproducing unit
200 Imaging element
210 Scanning unit
220 Pixel array unit
230 AD converting unit
240 Pre-processing unit
241 Gain adjusting unit
242 Clamping process unit
243 Scene change detecting unit
250 Managing unit
251 Time stamp producing unit
252 Address managing unit
260 Memory controller
270 Frame buffer
280 Post-processing unit
281 Re-mosaic process unit
282 Scaling process unit
290 Output interface

The invention claimed is:

1. An imaging element comprising:
a buffer that includes a plurality of areas; and
processing circuitry configured to:
produce an image in a case where an empty capacity of any of the plurality of areas exceeds a predetermined threshold value;
cause an area of the plurality of areas of the buffer whose empty capacity exceeds the predetermined threshold value to retain the image as a buffering image; and
extract the buffering image from the buffer and output the buffering image, in order of the retention of the buffering image, wherein the processing circuitry is configured to produce the image as a preview image at a first frame rate in a normal processing mode and, when the empty capacity of any of the plurality of areas of the buffer exceeds the predetermined threshold value in a high-speed shooting mode, produce the image as a high-speed image at a second frame rate in the high-speed shooting mode, wherein the second frame rate is greater than the first frame rate and wherein the high-speed image is retained as the buffering image.

2. The imaging element according to claim 1, wherein the processing circuitry is configured to output the preview image together with the buffering image at the first frame rate.

3. The imaging element according to claim 1, wherein the processing circuitry is configured to
cause the buffer to retain the preview image together with the buffering image, and
extract the buffering image and the preview image from the buffer and output these images, in order of retention of these images.

4. The imaging element according to claim 1, wherein the processing circuitry is configured to
extract the buffering image from the buffer and output the buffering image when a predetermined operation is executed.

5. The imaging element according to claim 1, wherein the processing circuitry is configured to
extract the buffering image from the buffer and output the buffering image when the high-speed shooting mode comes to an end.

6. The imaging element according to claim 1, wherein the processing circuitry is configured to
extract and output the plurality of buffering images at the first frame rate.

7. An imaging apparatus comprising:
a buffer that includes a plurality of areas;
processing circuitry configured to:
produce an image in a case where an empty capacity of any of the plurality of areas exceeds a predetermined threshold value;
cause an area of the plurality of areas of the buffer whose empty capacity the predetermined threshold value to retain the image as a buffering image; and
extract the buffering image from the buffer and output the buffering image, in order of the retention of the buffering image, wherein the processing circuitry is configured to produce the image as a preview image at a first frame rate in a normal processing mode and, when the empty capacity of any of the plurality of areas of the buffer exceeds the predetermined threshold value in a high-speed shooting mode, produce the image as a high-speed image at a second frame rate in the high-speed shooting mode, wherein the second frame rate is greater than the first frame rate and wherein the high-speed image is retained as the buffering image; and
a recording device configured to record the output image.

8. A control method for an imaging element, the control method comprising:
producing an image in a case where an empty capacity of any of a plurality of areas in a buffer that includes the plurality of areas exceeds a predetermined threshold value;
causing an area of the plurality of areas of the buffer whose empty capacity exceeds the predetermined threshold value to retain the image as a buffering image; and
extracting the buffering image from the buffer and outputting the buffering image, in order of the retention of the buffering image, wherein the image is produced as a preview image at a first frame rate in a normal processing mode and, when the empty capacity of any of the plurality of areas of the buffer exceeds the predetermined threshold value in a high-speed shooting mode, the image is produced as a high-speed image at a second frame rate in the high-speed shooting mode, wherein the second frame rate is greater than the first frame rate and wherein the high-speed image is retained as the buffering image.

* * * * *